June 28, 1960
H. J. WIER, SR
2,942,372
FISH SNARE
Filed Dec. 12, 1957
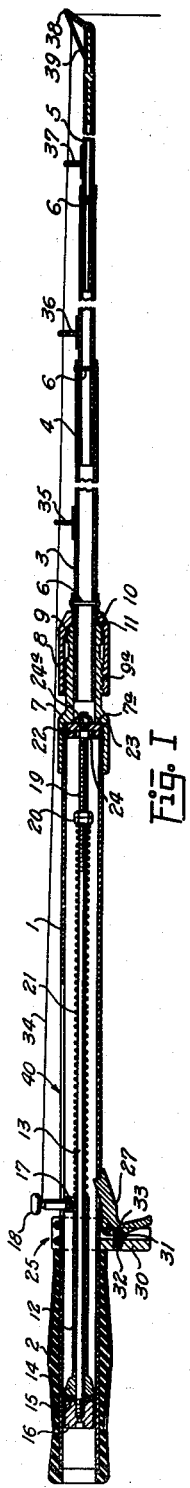
Fig. I
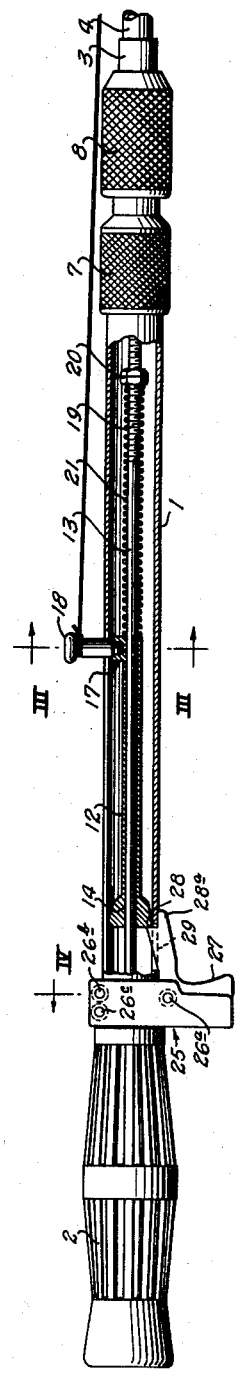
Fig. II
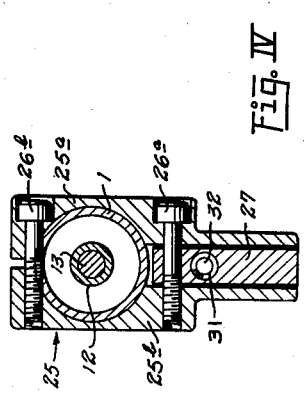
Fig. IV
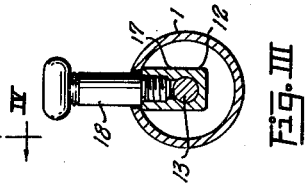
Fig. III
INVENTOR
Harvey J. Wier, Sr.
BY
ATTORNEY

United States Patent Office 2,942,372
Patented June 28, 1960

2,942,372

FISH SNARE

Harvey J. Wier, Sr., P.O. Box 124, Opelousas, La.

Filed Dec. 12, 1957, Ser. No. 702,458

4 Claims. (Cl. 43—15)

This invention is concerned with a fish snare and is particularly concerned with a fishing rod incorporating therein a triggered mechanism for giving a sudden jerk to the fishing line to cause the hook at the end of the line to contact and penetrate a fish which may be in contact therewith, or in close proximity thereto.

When a fish bites the hook or lure, causing a tug on the line, the fisherman may pull the trigger and cause the hook to suddenly jerk and snare the fish. In clear water the device may be used to snare a fish by visual manipulation. The hook or lure may be manipulated so as to come into close proximity to a fish, or it may be moved around among a school of fish, and the trigger pulled, so as to cause the hook to suddenly come into contact with a fish and catch him.

It is, therefore, an object of this invention to provide a trigger operated, spring actuated, fishing device which is manually operated to impart a sudden jerk to the fishing line to snare a fish.

A further object of the invention is to provide a fishing rod having incorporated therein a spring urged plunger attached to the fishing line which may be set in retracted position by a trigger and may be released to impart a jerk to the line by manual operation of the trigger.

Another object of the invention is to provide such a device in which the spring tension on the plunger may be adjusted.

A still further object of the invention is to provide in such a device a cushioned stop for the backward movement of the plunger. A specific object of the invention is to provide a spring urged plunger in a cylinder having an enlarged head on the plunger which guides the movement of the plunger in the cylinder, and is engageable with the trigger to set the plunger in retracted position.

Another object of the invention is to provide means for easily setting the plunger in retracted position including a knob attached to the plunger extending through an elongated slot in the wall of the cylinder which may be moved in the slot to bring the head on the plunger into engagement with the trigger.

A further object of the invention is to provide a rod in several sections which may be easily disjoined for the purpose of storing or transporting.

Other and further objects of this invention will become apparent upon reading the detailed specification hereinafter following and by referring to the drawing annexed hereto.

A preferred embodiment of the invention is shown in the attached drawing in which:

Figure I is a cross-sectioned side elevational view of the fishing rod and operating mechanism incorporated therein.

Figure II is a fragmentary, partially sectionalized, side elevational view, showing the plunger engaged with the trigger in retracted position.

Figure III is a cross-sectional view taken on the line III—III of Figure II.

Figure IV is a cross-sectional view taken on the line IV—IV of Figure II.

Numeral references are employed to designate the various parts of the device shown in the drawings and like numerals indicate like parts throughout the various figures of the drawings.

Referring to the drawings, the numeral 1 indicates a cylinder or housing, on one end of which is a handle 2, made of rubber or other resilient material. The other end of the fishing rod is made up of telescoped tubular sections 3, 4, and 5 which are secured together by means of suitable bolts or rivets 6.

A collet 7 is threadedly engaged to the cylinder 1. The collet 7 has a sectioned or split end 9 and has threads 9a on the outer side thereof.

The collet 7 is secured to the tubular section 3 by means of an elongated nut 8 which is threadedly engaged with the threads 9a. The internally tapered end 10 of the nut 8 comes into engagement with the outwardly tapered ends 11 of the collet prongs 9. As the collet nut 8 is moved upwardly on the threads 9a the co-acting tapered surfaces 10 and 11 on the nut 8 and the collet prongs 9 cause the prongs to be pressed inwardly against the tubular member 3 to thereby provide a connection between the collet 7 and the tubular member 3. The collet 7 and the nut 8 are knurled on their outer sides, as shown in Figure II, to provide a roughened grasping surface. It will be seen that the sections of the fishing rod may be easily disjoined by simply unscrewing the nut 8 to provide ease in storage and transportation.

A tubular plunger 12 is slidably disposed on the guide rod 13. The plunger 12 has an enlarged head 14 thereon which slides in the cylinder 1 and provides a guide for centering the plunger 12 in the cylinder 1. A ring of resilient material 15 is disposed about the rod 13 against the stop nut 16 which stop nut is threadedly engaged to the end of the rod 13. The resilient ring 15 provides a cushion against which the head 14 comes into contact when the plunger is released, as hereinafter described.

A laterally extending, internally threaded, socket 17 is provided on the inner end of the plunger 12 in which the setting knob 18 is threadedly engaged.

The rod 13 is provided with threads 19 on its inner end. The spiral spring 21 is disposed about the rod 13 between the inner end of the plunger 12 and the adjustment nuts 20. The tension of the spring 21 may be adjusted by movement of the adjustment nuts 20 on the threads 19.

The rod 13 is extended through an anchor ring 22, which has an annular flange 23 thereon clamped between the end of the cylinder 1 and the internal shoulder 7a, provided in the collet 7. The rod 13 is attached to the anchor ring 22 by means of the nuts 24 and 24a disposed on opposite sides of the ring 22 and threadedly engaged to the threads 19. The rod 13 may be adjusted with relation to the anchor ring 22 by the positioning of the nuts 24 and 24a on the rod.

The trigger support 25 (Fig. IV) is made up of complementary halves 25a and 25b which embrace the cylinder 1 and are clamped thereto by means of the cap screws 26a, 26b and 26c.

The trigger 27 is pivotally attached about the cap screw 26a. The inner end of the trigger 27 is provided with a shoulder 28 and an outwardly extending tongue 28a. The shoulder 28 is extendable through a slot 29, formed in the wall of the cylinder 1, and is engageable with the flat end face of the head 14 to thereby hold the plunger 12 in retracted position against the retracted spring 21. The tongue 28a engages the outer wall of the cylinder 1 to limit the inward movement of the trigger with relation to the cylinder.

The trigger 27 is spring urged so as to normally urge the tongue 28a against the cylinder to cause the shoulder 28 to extend inwardly of the housing 1. This is accomplished by a spring 31, one end of which extends into a socket 32, formed in the back wall 30 of the trigger support 25, and the other end of the spring 31 extends into a socket 32 formed on the inner face of the trigger 27.

A fishing line 34 is tied to the knob 18 and extends through guide eyelets 35, 36 and 37, attached in aligned position to the outer side of the fishing rod. The outer end of the fishing line extends through an angularly disposed guide ring 38, which is secured to the outer end of the fishing rod, and is held in supported position by a brace 39.

The knob 18 extends through an elongated slot 40, formed in the wall of the cylinder 1, such knob being movable longitudinally in the slot.

The operation and function of the fish snare hereinabove described is as follows: When it is desired to set the device for snaring a fish, the knob 18 is moved in the slot 40 to the right as shown in Figure II. This moves the plunger 12 and the head 14, carried thereby, in the same direction, and such movement is continued until the head 14 moves past and comes into contact with the shoulder 28 on the trigger 27 (Fig. II), thereby holding the plunger 12 against backward movement. The movement of the plunger 12 compresses the spring 21.

When a fish tugs on the line, or the hook or lure is brought into close proximity to a fish by visual aid, the trigger 27 may be manually pressed by the fisherman against the spring 31, disengaging the shoulder 28 from the head 14, releasing the plunger 12, and allowing the spring 21 to relax and rapidly move the plunger 12 backward until the head 14 contacts the resilient stop ring 15. Such rapid backward movement of the plunger 12 imparts a sudden jerk to the hook or lure (not shown) carried at the outer end of the fishing line 34, causing the hook or lure to come into contact with, and penetrate, the fish.

Thus it will be seen that I have provided a manually operated, triggered fish snare which is easily manipulated and set, and provides a positive means for imparting a jerk to a fishing line at the election of the fisherman. It does not depend upon a tug on the line by the fish for its actuation. It is completely controlled by the fisherman.

It will be understood that other and further forms of my invention may be made without departing from the spirit and scope of the appended claims.

I claim:

1. In a device of the class described, a tubular housing having an elongated slot in the wall thereof; an elongated guide rod affixed concentrically in the housing; a plunger slidably disposed on the rod; a spring retaining means carried on the rod in spaced relation to the plunger; a spiral spring disposed about the rod and confined between the plunger and spring retainer; line attaching means attached to the plunger and extending through the slot and being movable longitudinally therein; a manually operated trigger pivotally attached to the housing and having a part extending through an opening in the wall of the housing and engageable with the plunger to hold the plunger in retracted position; the said plunger being slidable forwardly on the guide rod to a position of engagement with the trigger as the spiral spring is compressed, spring means for urging the plunger engaging part of the trigger inwardly of the housing; and stop means attached to the rod rearwardly of the point of engagement between the trigger and the plunger, said stop means being engageable with the plunger to limit backward movement of the plunger on the rod when the plunger is released from the trigger to allow the plunger to move backward by recoil action of the spiral spring.

2. In a device of the class described, a tubular housing having an elongated slot in the wall thereof; an elongated guide rod affixed concentrically in the housing; a plunger slidably disposed on the rod; a spring retaining means carried on the rod in spaced relation to the plunger; a spiral spring disposed about the rod and confined between the plunger and spring retainer; line attaching means attached to the plunger and extending through the slot and being movable longitudinally therein; an enlarged head on the plunger slidably disposed in the housing; a manually operated trigger pivotally attached to the housing and having a part extending through an opening in the wall of the housing engageable with the head to hold the spring in retracted position; the said plunger being slidable forwardly on the guide rod to a position of engagement of the head with the trigger as the spiral spring is compressed, spring means for urging the plunger engaging portion of the trigger inwardly of the housing; and stop means attached to the end of the rod rearwardly of the point of engagement between the trigger and the plunger, said stop means being engageable with the plunger to limit backward movement of the plunger on the rod when the head is released from the trigger to allow the plunger to move backward by recoil action of the spiral spring.

3. In a device of the class described; a tubular housing having an elongated slot in the wall thereof; an elongated rod affixed concentrically in the housing; an elongated plunger slidably disposed on the rod; a threaded portion on the end of the rod in spaced relation to the plunger; an adjusting nut on the threaded portion, providing a spring retaining means; a spiral spring disposed about the rod and confined between the adjusting nut and the plunger; line attachment means attached to the plunger and extending through the slot and being movable longitudinally therein; a trigger pivotally attached to the housing and having a part extending through the wall of the housing engageable with the plunger to hold the plunger in retracted position; the said plunger being slidable forwardly on the guide rod to a position of engagement of the head with the trigger as the spiral spring is compressed, and means attached to the end of the rod rearwardly of the point of engagement between the trigger and the plunger, said means being engageable with the plunger to limit backward movement of the plunger on the rod when the plunger is released from the trigger to allow same to move backward by recoil action of the spiral spring.

4. The combination called for in claim 1 wherein the means for limiting backward movement of the plunger on the rod includes a resilient element interposed between the stop means and the plunger.

References Cited in the file of this patent

UNITED STATES PATENTS

| 768,028 | Braun | Aug. 23, 1904 |
| 2,605,569 | Kronhaus | Aug. 5, 1952 |
| 2,705,383 | Hatcher | Apr. 5, 1955 |
| 2,799,109 | Remington | July 16, 1957 |

FOREIGN PATENTS

| 486,397 | Italy | Nov. 6, 1953 |